United States Patent [19]

Boutsicaris

[11] Patent Number: 4,477,612
[45] Date of Patent: Oct. 16, 1984

[54] LIGNIN REINFORCED SYNTHETIC RUBBER

[75] Inventor: Stephen P. Boutsicaris, Akron, Ohio

[73] Assignee: The Firestone Tire & Rubber Company, Akron, Ohio

[21] Appl. No.: 461,345

[22] Filed: Jan. 27, 1983

[51] Int. Cl.$^3$ .............................................. C08L 97/00
[52] U.S. Cl. ...................................... 524/76; 524/72; 524/424
[58] Field of Search .................. 524/72, 76, 424, 495; 525/66, 77, 89, 78, 329.4; 526/364; 527/400

[56] References Cited

U.S. PATENT DOCUMENTS

| | | | |
|---|---|---|---|
| 2,844,549 | 7/1958 | Provost | 524/72 |
| 3,037,963 | 6/1962 | Cristenson | 260/72 |
| 3,118,852 | 1/1964 | Christenson et al. | 260/45.2 |
| 3,247,139 | 4/1966 | Christenson et al. | 260/21 |
| 4,308,353 | 12/1981 | Saito et al. | 525/78 |

*Primary Examiner*—Morton Foelak
*Assistant Examiner*—Kriellion Morgan
*Attorney, Agent, or Firm*—Daniel N. Hall

[57] ABSTRACT

A novel lignin reinforced synthetic rubber comprises 100 parts of a substituted acrylamide-containing synthetic rubber and from about five to 100 parts by weight of lignin, based upon the weight of said synthetic rubber. The substituted acrylamide-containing synthetic rubber, in turn, comprises from about 45 to 99 percent by weight of a conjugated diene monomer, from about 0.5 to 40 percent by weight of a monomer containing a vinyl group and copolymerizable with said conjugated diene monomer and, from about 0.5 to 15 percent by weight of an N-(alkoxymethyl)acrylamide monomer, the weight of each said monomer component being based upon the total weight of said substituted acrylamide-containing synthetic rubber. The synthetic rubber can optionally contain other SBR rubber and/or some carbon black. It has been found to possess better properties than standard SBR filled with lignin, with or without carbon black.

16 Claims, No Drawings

LIGNIN REINFORCED SYNTHETIC RUBBER

TECHNICAL FIELD

The present invention provides a novel reinforced synthetic rubber. The rubber comprises acrylamide-modified SBR alone or in combination with SBR and is reinforced with lignin or a mixture of lignin and carbon black. Such rubber can be employed in the manufacture of tires, conveyor belts and the like. The rubber must have a high modulus and good high temperature stability. When it is employed in tires, particularly in tread stocks, good rolling resistance and wet skid resistance properties are desirable.

BACKGROUND ART

It has been common practice to reinforce natural and synthetic rubber with carbon black. There has also been work performed utilizing lignin as a reinforcement for rubber. Lignin reinforced synthetic rubber, such as SBR, does not have as good of a thermal stability as carbon black reinforced SBR. When subjected to excess milling, modulus, tensile strength reductions and an increase in elongation have resulted. Furthermore, the modulus for lignin reinforced SBR is generally low.

Synthetic rubber compositions comprising styrene, butadiene and acrylamides have been described in several U.S. patents. U.S. Pat. Nos. 3,037,963, 3,118,852 and 3,247,139 each disclose such polymer materials which are reacted with and without other monomers and with aldehydes. Resinous products and coating materials are discussed in the various patents and there is no specified utility thereof as synthetic rubber for tire construction and the like. Nor, is there any disclosure of lignin or lignin-carbon black reinforcement.

Thus, the invention set forth herein is the first instance known to me wherein a synthetic rubber such as SBR can be successfully reinforced with lignin or lignin-carbon black mixtures where the SBR has been first modified with an acrylamide.

DISCLOSURE OF THE INVENTION

The novel lignin reinforced synthetic rubber of the present invention comprises 100 parts of a substituted acrylamide-containing synthetic rubber and from about five to 100 parts by weight of lignin, based upon the weight of the synthetic rubber. The composition of the substituted acrylamide-containing synthetic rubber, in turn, is from about 45 to 99 percent by weight of a conjugated diene monomer, from about 0.5 to 40 percent by weight of a monomer containing a vinyl group and copolymerizable with said conjugated diene monomer and, from about 0.5 to 15 percent by weight of an N-(alkoxymethyl)acrylamide monomer, the weight of each monomer component being based upon the total weight of the substituted acrylamide-containing synthetic rubber. The synthetic rubber can optionally contain from about 0 to 50 parts of SBR, substituting for an equal portion of the acrylamide-containing rubber and, it may also contain from about 0 to 60 parts of carbon black.

PREFERRED MODE FOR CARRYING OUT THE INVENTION

The synthetic rubber reinforced according to the present invention preferably comprises modified styrene-butadiene rubber or SBR. The modified SBR is prepared via emulsion polymerization in the presence of a substituted acrylamide monomer. The substituted acrylamide monomers that are copolymerized with rubber and plastic monomers to form different latices are the substituted acrylamides having the formula

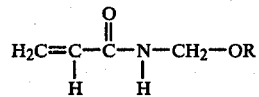

wherein R is a straight or branched alkyl chain having from one to about 20 carbon atoms with three to eight carbon atom chains being preferred. One particularly useful substituted acrylamide employed for the work reported herein is N-(isobutoxymethyl)acrylamide, hereinafter abbreviated IBMA, the R group being isobutyl.

While the preferred rubber is SBR, other emulsion polymerizable conjugated diene monomers and vinyl group monomers can be substituted for the rubber (butadiene) and plastic (styrene) components. These would include, respectively, conjugated diene monomers having from about four to 20 carbon atoms as well as halogenated or other substituted emulsion polymerizable diene monomers and, monovinyl aromatic compounds having from eight to about 20 carbon atoms including α-methylstyrene and other alkyl-substituted or halogen-substituted emulsion polymerizable monomers, and acrylic compounds having from three to about five carbon atoms, such as acrylonitrile and methyl methacrylate.

Preparation of the synthetic rubber is via emulsion polymerization with an emulsifier such as sodium lauryl sulfate. A water soluble initiator is employed such as diisopropylbenzene hydroperoxide and, a molecular weight modifier, n-dodecyl mercaptan, can be added. An activator such as tetraethylenepentamine is added to the reaction vessel immediately after the diene monomer is charged.

Other emulsifiers that would be suitable include long chain metal sulfonates and rosin acid salts. Amounts added range from about two parts per hundred of monomer (phm) to about five phm. Initiators suitable for the present invention other than diisopropylbenzene hydroperoxide include other free radical types such as peroxides and peroxydicarbonates, benzoyl peroxide, cumene hydroperoxide and tert-butyl peroxide, and the amount employed ranges from about 0.1 phm to about 0.6 phm depending upon the desired molecular weight of the polymer product. Similarly, the activators can include $FeSO_4.7H_2O$, alkyl amines having primary and secondary amines and sodium formaldehyde sulfoxylate in an amount of from about 0.1 phm to 0.6 phm. Other molecular weight modifiers suitable for this invention include tertiary alkyl mercaptans which are employed in amounts of from about 0.1 phm to about 0.3 phm. Antioxidants can also be employed such as di-tert-butyl-paracresol (DBPC) and Santoflex which are added to the polymer latex in amounts of from about 0.1 to about 1.0 percent by weight of the solid polymer.

It is to be understood that the composition of the present invention is not intended to be limited by the recitation of particular emulsifiers, intiators, activators or modifiers. All of these and others are well known to those skilled in the art and do not effect the improved properties imparted to the rubber discussed hereinbelow.

The SBR/IBMA terpolymer composition comprises from about 0.5 to 40 weight percent styrene; from about 45 to 99 weight percent butadiene and from about 0.5 to 15 weight percent IBMA. If desired, the SBR/IBMA terpolymer can itself be combined with from about 0 to 50 weight percent of straight SBR. The terpolymer or terpolymer/SBR blend contains from about five to about 100 parts of reinforcement per 100 parts of rubber (phr), the reinforcement comprising entirely lignin or up to about 60 weight percent carbon black.

Lignin is a major noncarbohydrate constituent of wood, the exact formula of which is unknown. A lignin product successfully employed in the work reported here was Indulin-AT, Indulin being a registered trademark of West Virginia Pulp and Paper for a series of lignin products obtained from wood pulp. With respect to the carbon black, substantially any type typically employed in rubber stocks can be employed and practice of the present invention is not limited to selection of any particular black or lignin product.

Preparation of the synthetic rubber of the present invention begins with the IBMA/SBR latex. This can be done by charging a separate reaction vessel with water, detergent, a modifier, if desired, the initiator and the substituted acrylamide, conjugated diene and vinyl monomer; polymerizing the monomers for a period of time of from about 7 to about 12 hours at a temperature of from about 0° C. to about 30° C. An aqueous alkaline solution of lignin is then added to a mixture of the IBMA/SBR latex and aromatic oil. The lignin solution is prepared as follows: lignin powder, in the sodium salt form, is added slowly to hot water (above 70° C.). When all the lignin is completely dissolved, the solution is ready for use and can comprise from about 10 to 25 weight percent lignin. A suitable range of pH includes about 9 to 12. The oil in the mixture is a conventional processing oil such as heavy aliphatic or aromatic and is employed in an amount of from about 10 to 50 phr.

After several minutes of stirring at 50° to 60° C., a 3.0% aqueous coagulant solution of a metal salt acidified with sulfuric acid to a pH of approximately 2.0 is added to the mixture which is then heated for several minutes until the lignin and IBMA/SBR polymer coprecipitate as a homogeneous mass of solid chunks.

The metal ions that coagulate the polymer latices are all divalent, trivalent and polyvalent metal ions such as aluminum, barium, cadmium, calcium, chromium, cobalt, iron, magnesium, manganese, nickel, tin, zinc and the like which are supplied as metal salts having the formula $MX_n$ wherein M is one of the foregoing elements, X is an anion such as an organic carboxylate, halide, hydroxide, nitrate, sulfate, sulfonate and the like and n is from two to six. The amount of the metal salt employed is that amount which will provide at least one equivalent mole of the metal ion and two equivalent moles of IBMA bonded to the polymer latex in the final product.

If a separate amount of SBR is to be employed it is added in the form of dry gum during the initial mixing steps of the compounding procedure. Similarly, where carbon black is desired, it is added during the Banbury or Brabender mixing. A masterbatch comprising the lignin-IBMA/SBR-oil precipitant with or without either or both, additional SBR and carbon black, is then compounded with conventional rubber processing and curing components for the desired manufacturing purpose.

In the experimental work set forth hereinbelow, the precipitation of the IBMA/SBR latex mixture containing oil was conducted as follows:

A mixture of 1600 parts IBMA/SBR latex (25% solids) and 146 parts aromatic oil was prepared to which was added with stirring a 20% aqueous alkaline solution containing 280 parts of Indulin-AT from West Vaco Co. After a few minutes of stirring at 50° to 60° C., a 3% aqueous coagulant solution of 75 parts calcium chloride acidified with sulfuric acid to a pH of about 2.0, was added to the latex-lignin mixture at 65° to 70° C. and then heated for several minutes to induce coprecipitation of lignin and latex to a homogeneous mass of solid chunks. The chunks were thereafter filtered, washed and dried.

A masterbatch was next formed with four separate examples, as set forth in Table I.

TABLE I

| | SBR-Lignin Masterbatch | | | |
|---|---|---|---|---|
| Example No. | 1 | 2 | 3 | 4 |
| SBR/IBMA | 100 | 50 | 100 | — |
| SBR (S1502) | — | 50 | — | 100 |
| Lignin | 32.5 | 32.5 | 65 | 32.5 |
| Carbon Black | 32.5 | 32.5 | — | 32.5 |
| Oil | 35 | 35 | 35 | 35 |

The separate charge of SBR employed in Examples 2 and 4, (S1502) was a commercially available SBR containing 23.5 percent bound styrene nonstaining polymer; having a Mooney viscosity (ML/4/100° C.) from 46 to 58 and a specific gravity of 0.94. It should be noted that Example 4 did not contain any SBR/IBMA and is therefore a control for comparison and, as such, it does not form a part of the present invention. The foregoing masterbatches were then mixed with the following ingredients to form the rubber compound subsequently tested:

| | |
|---|---|
| Masterbatch | 200.0 |
| ZnO | 5.0 |
| Stearic Acid | 2.0 |
| MBTS | 1.5 |
| Cumate | 0.5 |
| Sulfur | 2.0 |

A separate control stock, Example No. 5, was also prepared comprising Stereon SBR in a typical tread formulation. Stereon is a registered trademark of the Assignee of record for a stereoregular copolymer of styrene and butadiene prepared in a solution process.

Examples 1–5 were first subjected to thermal stability tests as set forth in Table II. Values reported in MPa include 300% modulus (M) tensile strength (TS) and percent elongation (E%). The milled compounded samples were separately cured for 15, 23 and 30 minutes at 149° C. Individual cured samples were tested against others of the same composition which had been subjected to additional milling of 10 and 20 minutes at 110° C. prior to curing; for Example 5, additional milling times were 10 and 30 minutes.

TABLE II

| | \multicolumn{15}{c}{Thermal Stability Tests} |
|---|---|

| | 1 | | | 2 | | | 3 | | | 4 | | | 5 | | |
| | IBMA | | | IBMA/1502 | | | IBMA | | | 1502 | | | Stereon | | |
| Example No. | Lignin/Black 50/50 | | | Lignin/Black 50/50 | | | Lignin | | | Lignin/Black 50/50 | | | Control | | |
|---|---|---|---|---|---|---|---|---|---|---|---|---|---|---|---|
| Mixing Time @ 110° C. (min) | 0 | 10 | 20 | 0 | 10 | 20 | 0 | 10 | 20 | 0 | 10 | 20 | 0 | 10 | 30 |
| Optimum Cure (min) | 9.4 | 12.4 | 11.6 | 12.0 | 12.6 | 11.7 | 14.6 | 20.4 | 20.2 | 13.4 | 15.3 | 15.4 | 22.3 | 20.8 | 16.2 |
| M 300% MPa | | | | | | | | | | | | | | | |
| 15' | 8.97 | 9.0 | 9.49 | 8.28 | 8.88 | 10.12 | 6.56 | 5.89 | 5.52 | 5.38 | 6.24 | 6.90 | 10.35 | 8.58 | 10.84 |
| 23' | 9.04 | 9.18 | 9.50 | 8.69 | 9.18 | 9.87 | 7.11 | 6.21 | 5.93 | 5.87 | 6.90 | 7.59 | 11.39 | 12.05 | 11.23 |
| 30' | 9.34 | 9.14 | 9.66 | 8.76 | 9.32 | 10.69 | 6.69 | 5.89 | 5.69 | 6.10 | 6.90 | 7.59 | 12.42 | 12.48 | 11.22 |
| TS MPa | | | | | | | | | | | | | | | |
| 15' | 18.63 | 20.70 | 22.08 | 17.94 | 20.01 | 21.73 | 17.25 | 17.94 | 16.56 | 14.49 | 17.25 | 17.94 | 24.15 | 22.08 | 23.11 |
| 23' | 17.07 | 21.11 | 19.32 | 16.21 | 18.11 | 23.11 | 15.52 | 17.59 | 16.21 | 13.45 | 15.87 | 18.28 | 20.01 | 22.08 | 22.77 |
| 30' | 18.97 | 19.32 | 21.18 | 17.59 | 18.97 | 21.39 | 15.18 | 16.21 | 17.25 | 14.66 | 16.56 | 17.94 | 19.66 | 22.77 | 23.11 |
| E % | | | | | | | | | | | | | | | |
| 15' | 515 | 550 | 550 | 515 | 565 | 535 | 585 | 625 | 610 | 600 | 600 | 600 | 850 | 585 | 520 |
| 23' | 485 | 540 | 505 | 490 | 510 | 525 | 505 | 585 | 590 | 510 | 575 | 575 | 450 | 468 | 490 |
| 30' | 480 | 513 | 533 | 488 | 520 | 505 | 500 | 575 | 605 | 565 | 570 | 570 | 420 | 465 | 485 |

Unexpectedly, the effect of additional milling was not deleterious to the physical properties of the cured stocks. Reduced modulus occurred only in Example 3, the SBR/IBMA-lignin reinforced polymer while the other three stocks generally showed an increase. Example 5 possessed higher modulus values which improved slightly and then decreased with additional mixing. Tensile properties and elongation were also good.

For purposes of comparison several other synthetic rubber stocks, Examples 6-8, not a part of the present invention, were subjected to thermal stability tests. These stocks comprised an SBR, S1712, which is an emulsion copolymer of only butadiene and styrene, and were reinforced only with 65 phr of lignin. Unlike the stocks of the present invention, no IBMA was present. Examples 6-8 were milled normally at 77° C. and then Examples 7 and 8 were milled additionally at 110° C. for periods of 15 and 30 minutes, respectively. Modulus, tensile and elongation properties for Examples 6-8 are reported in Table III.

TABLE III

| | Thermal Stability Tests | | |
|---|---|---|---|
| Example No. | 6 | 7 | 8 |
| Optimum Cure (min) | 32.8 | 38.8 | 54.8 |
| Ring Tensile-Cure 149° C. | | | |
| M 300% MPa | | | |
| 23' | | 3.93 | 3.24 | 2.34 |
| 30' | | 3.86 | 3.51 | 2.62 |
| TS MPa | | | |
| 23' | | 13.11 | 10.90 | 9.66 |
| 30' | | 13.31 | 11.17 | 10.35 |
| E % | | | |
| 23' | | 670 | 730 | 820 |
| 30' | | 710 | 720 | 810 |
| Aged Ring Tensile (149° C.) 2 Days at 100° C. | | | |
| M 300% MPa | | | |
| 23' | | 8.55 | 7.52 | 6.27 |
| 30' | | 8.62 | 8.41 | 5.45 |
| TS MPa | | | |
| 23' | | 20.97 | 18.63 | 19.45 |
| 30' | | 20.07 | 21.45 | 19.04 |
| E % | | | |
| 23' | | 570 | 600 | 670 |
| 30' | | 580 | 620 | 660 |

From Table III it can readily be seen that increased milling significantly reduced modulus and tensile properties and increased percent elongation and cure rate. It can also be seen that the 300% modulus for the lignin reinforced SBR (Ex. 6) is significantly lower than the 300% modulus for lignin reinforced IBMA/SBR (Ex. 3 of Table II). Based on this work, it is evident that the reinforcement of an SBR with lignin does not provide a useful stock, particularly when compared to an SBR reinforced with carbon black. The properties were significantly improved after aging, suggesting that the presence of lignin affected the cure system.

The significance of the heat stability tests establishes the properties likely to be possessed by a stock milled for a normal period of time on a hot mill or one which will be extruded. To be useful under normal processing and manufacturing conditions, a rubber stock should not be overly sensitive to excess milling or equivalent working. The data in Table II establishes that the presence of IBMA helped to reduce the deleterious effect of lignin in an SBR stock.

Returning to the stocks of the present invention, Examples 1-3 and the controls, Examples 4 and 5, were also subjected to testing prior to curing and after curing, reported in Tables IV and V, respectively.

TABLE IV

| | Properties of Raw Compounded Stock | | | | |
|---|---|---|---|---|---|
| Example No. | 1 | 2 | 3 | 4 | 5 |
| Optimum Cure (min) | 9.4 | 12.0 | 14.6 | 13.4 | 22.3 |
| Green Strength | | | | | |
| Initial MPa | .27 | .27 | .37 | .34 | .31 |
| Peak MPa | .72 | .74 | .96 | .40 | .40 |
| Break MPa | .62 | .62 | .96 | .20 | .19 |
| Elongation % | 505 | 580 | 260 | 520 | 620 |

TABLE V

| | Properties of Cured Stock | | | | |
|---|---|---|---|---|---|
| Example No. | 1 | 2 | 3 | 4 | 5 |
| Hardness, Shore A, 23° C. | 62.0 | 65.0 | 64.0 | 71.0 | 61.0 |
| Stress-Strain at 23° C. | | | | | |
| M 300% Mpa | 9.31 | 8.62 | 6.90 | 5.86 | 11.38 |
| TS MPa | 18.97 | 17.94 | 17.25 | 14.49 | 20.01 |
| E % | 500 | 505 | 585 | 600 | 450 |
| Aged Ring Tensile (2 days at 100° C.) | | | | | |
| M 300% MPa | 15.90 | 15.18 | 13.11 | 11.90 | 0 |
| TS MPa | 17.52 | 16.66 | 18.97 | 13.45 | 18.28 |
| E % | 323 | 300.5 | 398 | 340 | 257 |
| Stanley-London Traction | 37 | 39 | 36 | 39 | 35 |
| Rebound | | | | | |
| 23° C. | 50.0 | 45.0 | 51.0 | 37.5 | 48.0 |
| 100° C. | 62.0 | 62.0 | 58.0 | 64.0 | 69.0 |

TABLE V-continued

| | Properties of Cured Stock | | | | |
|---|---|---|---|---|---|
| Example No. | 1 | 2 | 3 | 4 | 5 |
| Compression Set % | 17.6 | 16.8 | 26.4 | 20.0 | 13.5 |
| MTS, Tan δ | | | | | |
| 23° C. | .174 | .183 | .194 | .267 | .173 |
| 100° C. | .128 | .149 | .163 | .207 | .153 |
| Running Temperature, °C. | 135 | 131 | 173 | 164 | 123 |
| Blow Out Time (min) | 23 | 24.5 | 9 | 13 | 63.5 |
| Hot Ring Tear, MPa | | | | | |
| 23° C. | 2.51 | 2.91 | 2.18 | 2.55 | 2.04 |
| 100° C. | 1.80 | 1.87 | 1.15 | 1.22 | 1.06 |

With reference to Table V, Examples 1, 2 and 3 exhibited better properties than Example 4 where no IBMA was present and comparable to Example 5, a typical tread formulation with no lignin present. Proper hardness, for instance, is important and is possessed by Example 5, a proven tire compound. Examples 1–3 containing IBMA/SBR and lignin came very close to the hardness values of Example 5.

With respect to stress-strain, again Example 5 is a good target for comparison. The 300% moduli for Examples 1–3 were below Example 5, but were nevertheless adequate and significantly better than a straight SBR with lignin, e.g., Example 6 of Table IV which would not be adequate in modulus, especially if processed at a high temperature. Aging values established that Examples 1–3, representing the present invention, were as good as Example 5.

High Stanley-London values were desirable as high value indicates good wet traction. Stanley-London Traction values were higher for Examples 1–3 than for Example 5 which indicated that wet skid resistance would be satisfactory.

Rebound and Tan δ relate to hysteresis which, in turn, relates to rolling resistance. High rebound or low hysteresis indicates low or improved rolling resistance. Lower Tan δ values also means lower rolling resistance. Running temperature also relates to rolling resistance and low running temperatures are desired. Low Tan δ values were reported for Examples 1 and 2 which were actually below the value for Example 5 at 100° C.

Based upon the improved thermal stability and other physical properties reported in Tables II and V, it should be apparent that a novel lignin-reinforced SBR has been described. It is to be understood in the practice of the present invention, no particular SBR, lignin or N-(alkoxymethyl)acrylamides are required and that the subject invention is not to be limited by the examples set forth herein. These have been provided merely to demonstrate operability and, therefore, the selection of specific components can be determined without departing from the spirit of the invention herein disclosed and described.

Similarly, the present invention is not to be limited by the presence of any carbon black or, if employed, to any specific carbon black. It is also to be understood that the relative amounts of lignin and SBR/IBMA, as well as SBR and carbon black where desired, that are employed can be determined without departing from the spirit of the invention herein disclosed and described, and that the scope of the invention shall include all modifications and variations that fall within the scope of the attached claims.

What is claimed is:

1. A novel lignin reinforced synthetic rubber comprising:
   100 parts of a substituted acrylamide-containing synthetic rubber; and
   from about five to 100 parts by weight of lignin, based upon the weight of said synthetic rubber;
   wherein said substituted acrylamide-containing synthetic rubber comprises:
      from about 40 to 98 percent by weight of a conjugated diene monomer;
      from about 0.5 to 40 percent by weight of a monomer containing a vinyl group copolymerizable with said conjugated diene monomer; and
      from about 0.5 to 15 percent by weight of an N-(alkoxymethyl)acrylamide monomer, the weight of each said monomer component being based upon the total weight of said substituted acrylamide-containing synthetic rubber; and
   wherein said lignin reinforced synthetic rubber is prepared by coprecipitating a latex blend of said monomers with an acidified polyvalent metal ion solution so as to provide at least one equivalent mole of polyvalent metal ion with two equivalent moles of said N-(alkoxymethyl)acrylamide monomer bonded to the synthetic rubber latex.

2. A novel synthetic rubber, as set forth in claim 1, wherein said conjugated diene monomer has from four to about 12 carbon atoms;
   said monomer containing a vinyl group is selected from the group consisting of monovinyl aromatic compounds having from eight to about 20 carbon atoms and acrylic compounds having from three to about five carbon atoms, including halogen-substituted compounds; and
   said N-(alkoxymethyl)acrylamide has the formula

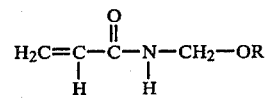

wherein R is a straight or branched alkyl chain having from 1 to about 20 carbon atoms.

3. A novel synthetic rubber, as set forth in claim 2, wherein said conjugated diene monomer is 1,3-butadiene, said monomer containing a vinyl group is styrene and said N-(alkoxymethyl)acrylamide monomer is N-(isobutoxymethyl)acrylamide.

4. A novel synthetic rubber, as set forth in claim 3, wherein said substituted acrylamide-containing synthetic rubber comprises:
   15 parts of styrene;
   82 parts of butadiene; and
   3 parts of an N-(isobutoxymethyl)acrylamide.

5. A novel synthetic rubber, as set forth in claim 1, further comprising:
   from about 0 to 50 parts by weight of a copolymer prepared from said conjugated diene monomer and said monomer containing a vinyl group.

6. A novel synthetic rubber, as set forth in claim 5, wherein said conjugated diene monomer has from four to about 12 carbon atoms;
   said monomer containing a vinyl group is selected from the group consisting of monovinyl aromatic compounds having from eight to about 20 carbon atoms and acrylic compounds having from three to about five carbon atoms, including halogen-substituted compounds; and
   said N-(alkoxymethyl)acrylamide has the formula

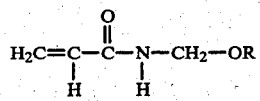

wherein R is a straight or branched alkyl chain having from 1 to about 20 carbon atoms.

7. A novel synthetic rubber, as set forth in claim 6, wherein said conjugated diene monomer is 1,3-butadiene, said monomer containing a vinyl group is styrene and said N-(alkoxymethyl)acrylamide monomer is N-(isobutoxymethyl)acrylamide.

8. A novel synthetic rubber, as set forth in claim 7, wherein said substituted acrylamide-containing synthetic rubber comprises an SBR/IBMA terpolymer and said copolymer comprises an SBR.

9. A novel synthetic rubber, as set forth in claim 8, comprising:
50 parts of said SBR/IBMA terpolymer and 50 parts of said SBR.

10. A novel synthetic rubber, as set forth in claim 1, further comprising:
from about 0 to 60 parts by weight of carbon black substituting for an equal portion of said lignin.

11. A novel synthetic rubber, as set forth in claim 10, comprising:
50 parts by weight of lignin and 50 parts by weight of carbon black.

12. A novel synthetic rubber, as set forth in claim 10, further comprising:
from about 0 to 50 parts by weight of a copolymer prepared from said conjugated diene monomer and said mcnomer containing a vinyl group.

13. A novel synthetic rubber, as set forth in claim 12, wherein said conjugated diene monomer has from four to about 12 carbon atoms;
said monomer containing a vinyl group is selected from the group consisting of monovinyl aromatic compounds having from eight to about 20 carbon atoms and acrylic compounds having from three to about five carbon atoms, including halogen-substituted compounds; and
said N-(alkoxymethyl)acrylamide has the formula

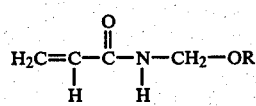

wherein R is a straight or branched alkyl chain having from 1 to about 20 carbon atoms.

14. A novel synthetic rubber, as set forth in claim 13, wherein said conjugated diene monomer is 1,3-butadiene, said monomer containing a vinyl group is styrene and said N-(alkoxymethyl)acrylamide monomer is N-(isobutoxymethyl)acrylamide.

15. A novel synthetic rubber, as set forth in claim 14, wherein said substituted acrylamide-containing synthetic rubber comprises an SBR/IBMA terpolymer and said copolymer comprises an SBR.

16. A novel synthetic rubber, as set forth in claim 15, comprising:
50 parts of said SBR/IBMA terpolymer and 50 parts of said SBR.

* * * * *